No. 840,945. PATENTED JAN. 8, 1907.
R. S. G. LANE.
PRESSED STEEL AXLE.
APPLICATION FILED DEC. 11, 1905.
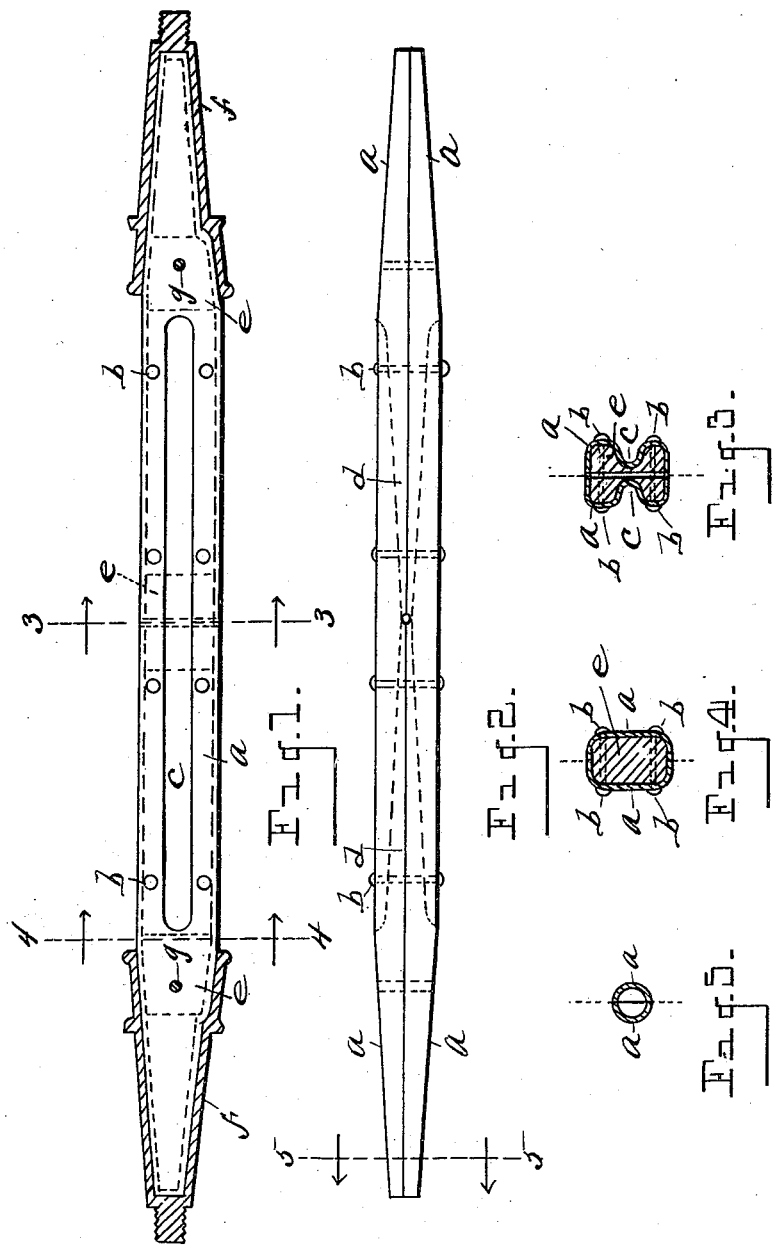
Witnesses.
O. B. Baenziger
A. M. Murphy
Inventor.—
Robert S. G. Lane,
By Newell S. Wright
his Attorney.

UNITED STATES PATENT OFFICE.

ROBERT S. G. LANE, OF DETROIT, MICHIGAN, ASSIGNOR OF ONE-HALF TO ROBERT J. H. TITCOMBE AND EDWARD L. TITCOMBE, OF DETROIT, MICHIGAN.

PRESSED-STEEL AXLE.

No. 840,945.         Specification of Letters Patent.         Patented Jan. 8, 1907.

Application filed December 11, 1905. Serial No. 291,275.

*To all whom it may concern:*

Be it known that I, ROBERT S. G. LANE, a citizen of the United States, residing at Detroit, county of Wayne, State of Michigan, have invented a certain new and useful Improvement in Pressed-Steel Axles, of which the following is a specification, reference being had to the accompanying drawings, which form a part of this specification.

My invention has for its object a pressed-steel axle for wagons and other vehicles; and it consists of the construction hereinafter described and claimed, and illustrated in the accompanying drawings, in which—

Figure 1 is a view in side elevation showing a skein in section at each end of the axle. Fig. 2 is a view in plan. Fig. 3 is a view in cross-section on the line 3 3, Fig. 1. Fig. 4 is a view in section on the line 4 4, Fig. 1. Fig. 5 is a view in cross-section on the line 5 5, Fig. 2.

My invention contemplates the construction of a pressed-steel axle, the axle being constructed either in a single or of multiple parts, as may be desired. While the pressed-steel axle might be made in a single integral piece, yet it would be more economical to manufacture the same of multiple parts, as the dies for manufacturing the same of multiple parts would be less expensive. I have shown my pressed-steel axle made in two parts, said parts being secured together in any suitable manner.

In the drawings, *a a* represent two parts formed of pressed-steel of suitable shape, the same being shown riveted together, as indicated at *b*. I prefer to construct the upper and lower faces of the respective parts of the axle with inwardly-projecting ribs (indicated at *c*) to strengthen the structure. The top and bottom may also be formed with inwardly-projecting ribs (indicated at *d*) for the same purpose. The ribs *c* are shown formed with parallel sides, while the ribs *d* may flare in opposite directions. For certain purposes I prefer also to provide within the two parts *a a* of pressed steel a filling (indicated at *e*) to give the axle additional strength, as where a king-bolt or other bolts are desired to be passed through the axle or at points where there is liable to be special strain upon the axle. The filler-blocks can be made of malleable iron, for example; but I do not limit myself to their use, as for lighter vehicles they will not be needed, the fillers being only desirable in any event for vehicles of considerable weight.

The skeins (indicated at *f*) may be secured upon the opposite ends of the axle and, if desired, might be bolted thereupon, as indicated at *g*. The extremities of the axle would be formed annular in cross-section and narrowing outwardly, as shown, so that the skeins might readily be fitted thereupon.

What I claim as my invention is—

1. A hollow vehicle-axle comprising a body formed of multiple parts of pressed steel, said parts arranged vertically side by side and having the extremities thereof made tapering and of annular form in cross-section, bolts passed horizontally through said parts to secure the parts together, separately-constructed skeins sleeved upon the tapering extremities of the body, means to strengthen the body at the longitudinal center thereof, and a king-bolt orifice passed through the body and through said strengthening means, said parts provided with strengthening-ribs on the front and rear lateral faces thereof.

2. A hollow vehicle-axle formed of pressed steel made of multiple parts, said parts arranged vertically side by side and secured together, and a filler within the hollow pressed-steel parts at the longitudinal center of the axle, said filler provided with a vertical orifice to receive a bolt for the purpose described.

3. A hollow vehicle-axle comprising a body formed of multiple parts of pressed steel, said parts arranged vertically side by side and having the extremities thereof made tapering and of annular form in cross-section, bolts passing horizontally through said parts to secure the parts together, a filler within the hollow parts at the longitudinal center of the axle, and separately-constructed skeins sleeved upon the tapering extremities of the body, said parts provided with strengthening-ribs on the front and rear lateral faces thereof.

In testimony whereof I have signed this specification in the presence of two subscribing witnesses.

ROBERT S. G. LANE.

Witnesses:
  N. S. WRIGHT,
  A. M. MURPHY.